United States Patent
Faratzis (10) Patent No.: US 9,421,457 B2
(45) Date of Patent: *Aug. 23, 2016

(54) SPORTS ENTERTAINMENT DISPLAY SURFACE

(71) Applicant: John Faratzis, Calabasas, CA (US)

(72) Inventor: John Faratzis, Calabasas, CA (US)

(*) Notice: Subject to any disclaimer, the term of this patent is extended or adjusted under 35 U.S.C. 154(b) by 419 days.

This patent is subject to a terminal disclaimer.

(21) Appl. No.: 13/751,038

(22) Filed: Jan. 25, 2013

(65) Prior Publication Data
US 2014/0213352 A1    Jul. 31, 2014

(51) Int. Cl.
| | |
|---|---|
| B07B 13/00 | (2006.01) |
| A63F 13/20 | (2014.01) |
| A63F 13/00 | (2014.01) |
| A63F 13/90 | (2014.01) |
| A63B 67/00 | (2006.01) |
| A63B 71/06 | (2006.01) |
| A63C 19/02 | (2006.01) |

(52) U.S. Cl.
CPC ............. *A63F 13/06* (2013.01); *A63B 67/00* (2013.01); *A63B 71/0605* (2013.01); *A63B 71/0622* (2013.01); *A63C 19/02* (2013.01); *A63F 13/005* (2013.01); *A63F 13/08* (2013.01); *A63B 2071/0658* (2013.01); *A63B 2071/0675* (2013.01); *A63B 2220/10* (2013.01); *A63B 2220/56* (2013.01); *A63B 2220/806* (2013.01); *A63B 2220/83* (2013.01); *A63B 2225/09* (2013.01); *A63B 2225/20* (2013.01); *A63B 2225/50* (2013.01); *A63F 2300/1068* (2013.01)

(58) Field of Classification Search
USPC ................. 463/31–42; 349/96; 455/426.2
See application file for complete search history.

(56) References Cited

U.S. PATENT DOCUMENTS

| | | | | |
|---|---|---|---|---|
| 2004/0171381 | A1* | 9/2004 | Inselberg | 455/426.2 |
| 2007/0062852 | A1* | 3/2007 | Zachut | A63F 3/00643 209/683 |
| 2007/0236632 | A1* | 10/2007 | Kanbe et al. | 349/96 |
| 2008/0136741 | A1* | 6/2008 | Williams | G07F 17/3211 345/3.3 |
| 2009/0111577 | A1* | 4/2009 | Mead | G07F 17/3211 463/31 |
| 2009/0302533 | A1* | 12/2009 | Smith | A63F 7/0668 273/108.1 |

OTHER PUBLICATIONS

"LED Illuminated Glass Sports Flooring by ASB", Jan. 23, 2013, <https://web.archive.org/web/20130123084229/http://www.designboom.com/technology/led-illuminated-glass-sports-flooring-by-asb/>.*
"Core77: Presenting the TRoin Basketball Court", Jan. 21, 2013, <https://web.archive.org/web/20130122012603/http://www.core77.com/blog/materials/presenting_the_tron_basketball_court_asb_glassfloor_pushes_boundaries_of_glass_for_athletic_applications_24217.asp>.*

* cited by examiner

Primary Examiner — Masud Ahmed
(74) Attorney, Agent, or Firm — Hackler Daghighian & Martino (57) ABSTRACT

A sports surface arrangement is provided. The sports surface arrangement includes at least one display, each display mounted in a substantially horizontal orientation facing in an upward direction, a substantially transparent covering layer positioned above the at least one display, and a controller configured to alter at least one image displayed on the at least one display to alter attributes of a sporting event, competition, or game occurring on the substantially transparent covering layer. Alternately, an apparatus is provided that includes a controller configured to transmit sports related display information to at least one horizontally mounted display screen and a substantially transparent surface positioned above the horizontally mounted display screen and configured to withstand sports competitors participating in a sporting event, game, or competition thereon. The controller conveys display information related to the sporting event occurring on the substantially transparent surface to the display.

21 Claims, 4 Drawing Sheets

SPORTS ENTERTAINMENT DISPLAY SURFACE

The present application is related to U.S. patent application Ser. No. 13/751,040, entitled "Sports Entertainment Apparatus", inventor John Faratzis, filed Jan. 25, 2013, the entirety of which is incorporated herein by reference.

FIELD OF THE INVENTION

The present invention relates generally to the field of sports entertainment, and more specifically to interactive sports entertainment playing surface and an accompanying audience participation system.

BACKGROUND OF THE INVENTION

Sports entertainment is annually growing in interest around the world. The current state of sports entertainment is that of sports figures competing on a static playing field with an audience observing, typically an audience in a stadium or arena as well as in some situations a television audience. The sports participants compete in their respective sports (football, basketball, soccer, baseball, hockey, tennis, golf, cricket, track and field, automobile racing, and so forth) and a winner declared. Advertising is typically provided, and it is not an understatement to say that sports entertainment is enormously popular and highly lucrative.

Sports related entertainment offerings have increased over the years to satisfy the public's desire to view sports competition. Additional tennis tournaments, basketball leagues, football leagues, and so forth have been established, and more sporting events are now televised to wider audiences. Certain sports related programming has been created, such as the "Superstars" programs on ABC, that place professional or amateur athletes, celebrities, or persons simply having athletic abilities in competitive sports situations, at times combined with the attributes of reality television programming.

Coupled with the increased interest in sporting events and sports in general is the advent and rapid increase in social networking. Persons are becoming much more interested in interacting with friends and people with like interests online. Many people, particularly younger people, interact with numerous friends, business associates, relatives, and even strangers who share common interests. People interact with merchants using social media, and services have been established to facilitate interaction—Twitter, Facebook, etc.

While the sports world has used social media in several ways, it has not enabled persons attending a sporting event or viewing a sporting event to interact with the sporting event. The extent of social media or virtual interaction with a sporting event or participants in a sporting event has been persons submitting questions or statements that are read on the air or displayed on the air, with occasional questions answered by persons also observing the event—announcers, reporters, etc. There is no way for the observers to interact with their friends and interact with the players or the play of the game. In fact, certain sports leagues prohibit interaction between the fans and the sports participants during a game or match. This leaves a number of sports fans with limited options relative to the sporting event, essentially simply watching the event and interacting with friends, but not with the sporting event or sports personalities themselves.

Further, the sports world is relatively static in its construct. For example, every football field is the same dimension, every tennis court the same dimension, every NHL hockey rink the same dimension, and so forth. Every free throw line in every NBA arena is the same distance, 15 feet, from the basket. Every base in Major League Baseball is 90 feet from two other bases. The track at the Indianapolis 500 is a static 2.5 mile paved surface.

In view of the current state of sports entertainment, it would be beneficial to offer a design that employs the beneficial aspects of social networking and interactivity while at the same time enhancing the static conditions associated with sporting events and generally increasing fan interest in sports.

SUMMARY

According to one embodiment, there is provided a sports surface arrangement comprising at least one display, each display mounted in a substantially horizontal orientation facing in an upward direction, a substantially transparent covering layer positioned above the at least one display, and a controller configured to alter at least one image displayed on the at least one display to alter attributes of a sporting event, game, or competition occurring on the substantially transparent covering layer.

According to another embodiment, there is provided an apparatus for use in association with a sporting event. The apparatus comprises a controller configured to transmit sports related display information to at least one horizontally mounted display screen and a substantially transparent surface positioned above the horizontally mounted display screen and configured to withstand sports competitors participating in a sporting event thereon. The controller conveys display information related to the sporting event occurring on the substantially transparent surface to the display.

Other features and advantages of the present invention should be apparent from the following description of exemplary embodiments, which illustrate, by way of example, aspects of the invention.

DETAILED DESCRIPTION OF THE INVENTION

According to the present design, there is provided a sports entertainment system comprising a unique sports surface enabling altering of standard areas employed in the sport or sports, as well as providing enhanced areas from a sports perspective thereon. The present design also includes an interactivity component that enables persons to convey desired actions to the sports surface and dictate enhanced opportunities during the sporting event, such as bonus areas or penalty areas. The present design may be employed in various sporting events that typically employ a hard surface, including but not limited to basketball and tennis, but any type of game playable on a surface may benefit from the present design. The design enables a fan to interact with a device, such as a computer or smartphone or a television to convey a desired change in the sporting event, and a system that compiles fan communications and alters indications on the playing surface accordingly.

Sports Playing Surface

Figure 1:
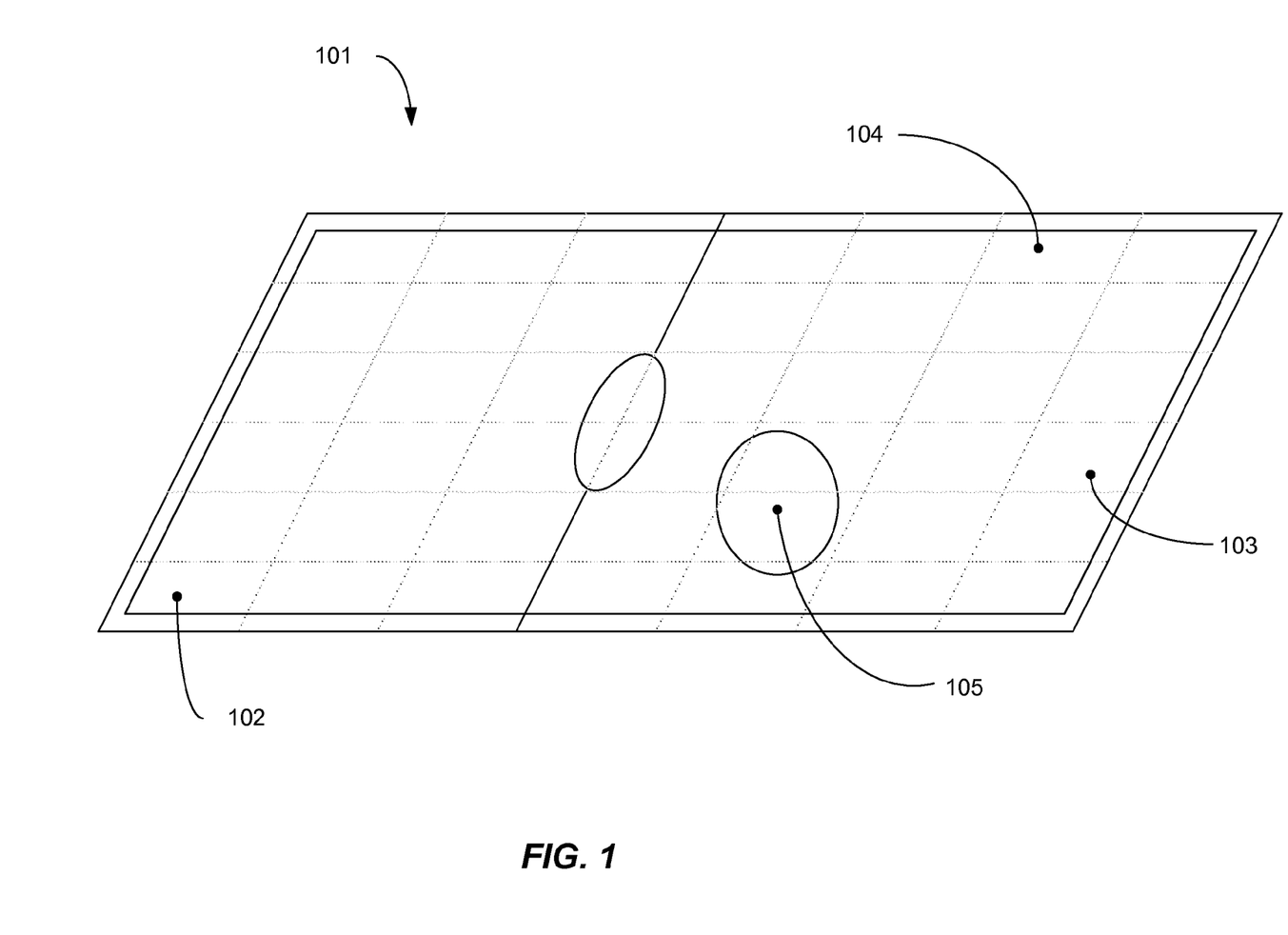
FIG. 1 illustrates an interactive sports surface provided in accordance with the present design.

FIG. 1 illustrates the sports surface 101 of the present design. FIG. 1 illustrates various display zones such as zones 102, 103, and 104 that provide certain information to the athletes and to those viewing the sporting event. Region 105 is being displayed using sports surface 101 and represents a "hot spot" or bonus area.

Figure 2:
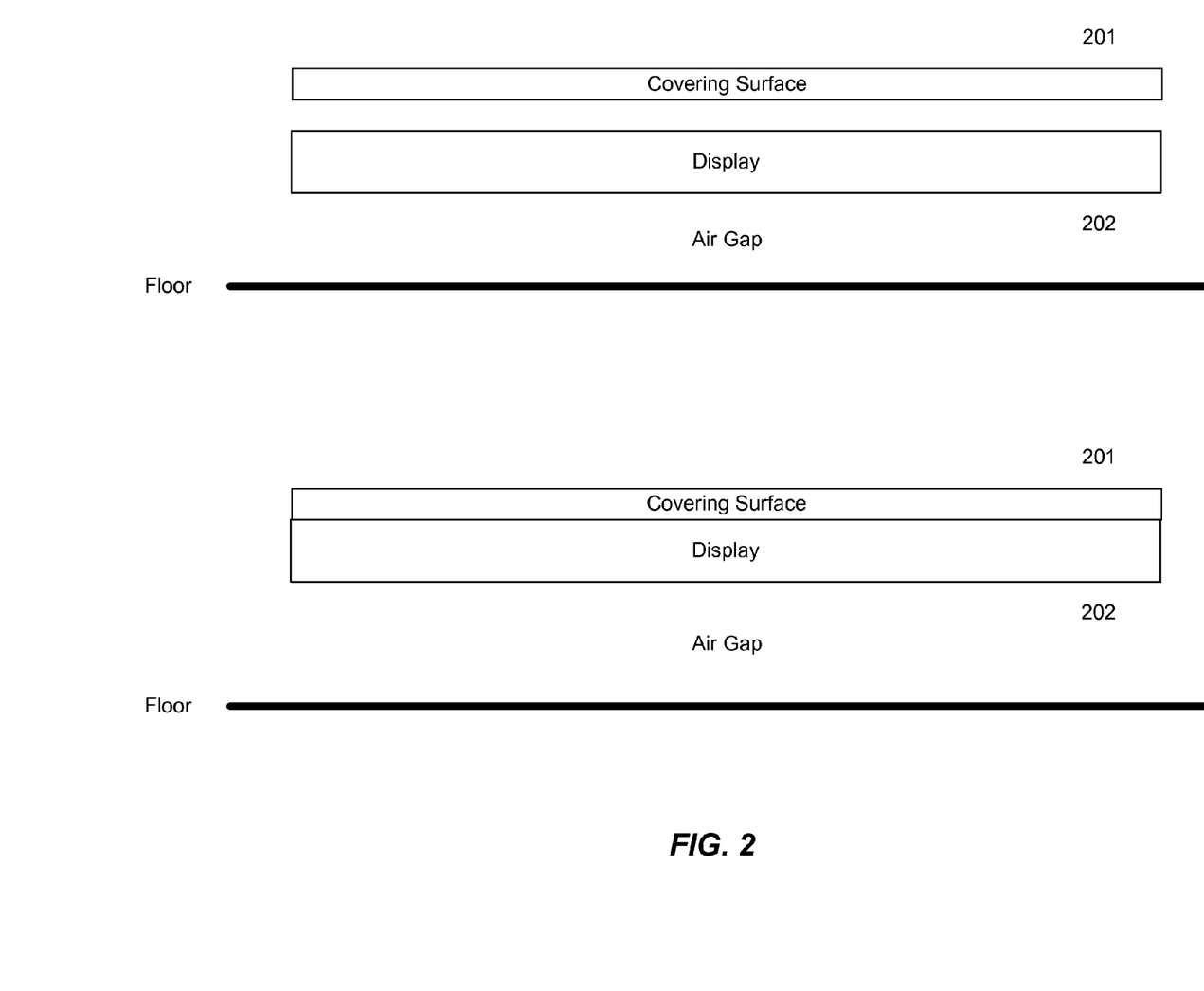
FIG. 2 illustrates a side view of one embodiment of the interactive display surface of the present design.

The sports surface is a hard surface over a display surface, as shown in cross section in FIG. 2. The sports surface 101 may include one or more displays and one or more covering surfaces.

In general, sports surface 101 may be employed in various environments, but the more likely sporting events are those employing hard surfaces, such as tennis, volleyball, basketball, racquetball, badminton, team handball, and sports such as fencing, bowling, and indoor soccer may employ the sports surface provided herein. The sports surface 101 when used in a "court" or "floor" type sport typically has the same or similar dimensions as a playing surface used in the sporting event occurring thereon. For example, a basketball court may be reduced in size if desired to create more of a "half court" type game. Such a sports surface may also be employed as a portion of, or conceivably all of, a racing track for a footrace between runners or even an automobile race, or the control surface may be positioned beside the competitors. As an example, a center or side area of an oval track may be provided with sports surface 101 either as the track or as a centerline positioned within the track or a line or lines at varying positions around the track.

The present design provides an ability for both the participants and audience to view the underlying display of information and the ability to change the underlying information displayed, with the intent of both the participants and observers being able to interact with and view the sports surface 101 and changes conveyed via sports surface 101.

In general, the sports surface 101 may be constructed from a plurality of display devices positioned below a covering surface 201, such as glass, polycarbonate, Plexiglas or other acrylic (e.g. materials known by the brand names of Acrylite®, Optix®, Perspex® and Polycast®), or similar material disposed above the display surface 202 representing the surface of display 203. While shown in FIG. 2 as a single layer, it is to be understood that such a covering surface 201 may comprise multiple layers of the same or different materials based on the desired application. Such materials may be easily cut and thermo formed without loss of optical clarity, tends to not degrade in the sun, and light scratches may be removed relatively easily. Plexiglas acrylic, for example, offers a 92% light transmittance. It may be beneficial in certain applications to provide layers of tear-away transparent dirt protection film such as a Kynar Film on top of the covering surface or surfaces.

A single display device may be employed, but alternately, multiple adjoining display devices as shown in FIG. 1 may be provided. In one embodiment, the display devices may include existing DLP LED projection devices, such as those produced by Christie Digital Systems. Such devices are typically solid state, high resolution, and require low maintenance. Not shown in FIG. 2 is a possible clear shock absorbent layer or alternately a layer of gas such as air between the display surface or surfaces and the covering surface 201.

Whether one or multiple screens are employed, as shown in FIG. 2, a gap or air space 204 is provided beneath the display 203 for venting purposes. As may be appreciated, FIG. 2 is not to scale but is intended to show the various components, including covering surface 201, display surface 202, display 203, and gap or air space 204. Typically the arrangement of FIG. 2 is elevated above a floor (not shown), such as an arena floor using hardware for elevating such devices, i.e. metal racks and/or other equipment known in the art. Elevation of these components accommodates ventilation requirements of the display or displays and allows access to the controls built into the display(s)/display monitor(s).

Further, while a display or array of displays is contemplated, it is to be understood that any type of display surface could be employed, including a surface employing DLP technology, fiber optics, or other appropriate display device or devices.

The video devices or video blocks beneath the display surface are configured to display computer generated graphics. In the case of a tennis match, the surface might be a color similar to the colors used on a tennis court, such as green, or any color may be used. Further, the displays may be configured or controlled to show the lines of the tennis court, such as the back line, service boxes, and so forth. In the basketball arrangement, the foul line, boundary lines, three point lines, lane lines, and other appropriate lines may be provided and altered depending on the setup. For example, if Olympic style rules are employed, basketball lines may be altered accordingly.

When employing such an arrangement of displays, different functionality may be provided. For example, a foul line in basketball may be moved toward or away from the basket, zones may be created, such as bonus zones or penalty zones, advertising provided, timing indications provided (turning all screens black when time goes to zero), and so forth. As an example, a desire to provide a "hot spot" may be provided for tennis player X. Tennis player X, playing player Y, may have difficulty making a backhand shot to the left side of the court. If desired, a "hot spot" or target region may be provided on the left side of player Y's side of the court, wherein player X hitting the ball into the "hot spot" receives a bonus. Alternately, if a team has difficulty making three point shots in basketball, to balance the competition the three point line for that team could be moved closer to the basket, or conversely, the three point line for the other team could be moved away from the basket. The three point line could also be changed to a four point line during the course of a basketball game. In another arrangement, a region for indoor soccer could be declared off limits to Team A, and any goal scored by a Team A player from the off limits region would be disallowed. The variations of the sports surface display are extensive and are essentially only limited by the ideas of those controlling the field of play.

In a footrace, certain points may need to be touched or traversed to add variety to the race, such as a requirement for the participants to go to Point or Line P and then back to line Q closer to the starting line. Alternately, one competitor may be required to perform a certain action, such as transition from running to race walking, at a certain point or time during the competition, i.e. when conveyed on the playing surface.

The present sports surface design enables various changes to be made as competition occurs. Such a design represents a change from traditional sports wherein the playing surface or surfaces are static in nature. The ability to change the parameters of competition while the participants are competing can be compelling to the audience.

Additional devices may be provided with the arrangement of FIGS. 1 and 2. As an example, a set of sensors may be provided beneath the covering surface 201 to sense when a player is standing on covering surface 201. Sensors are not necessary to the design but represent an optional component, and the present design may be realized without sensors on or near the court. It is to be understood that sensors in this application may also include devices configured to track player position, ball position, in essence any object or participant on or near the surface. Various sensors may be provided, such as pressure sensors mounted beneath the covering surface or surfaces that are small or are otherwise unobtrusive and do not materially block the displays beneath. In certain applications, a relatively large number of sensors may be provided per square foot over the entire sports surface 101 or parts thereof in order to sense minor occurrences on the sports surface 101, such as a tennis ball striking the surface.

As noted, the sensor or sensing arrangement may include devices monitoring the playing surface from a position above the surface, such is currently done in tennis. In current designs, such as in broadcast of NFL football games, lines and information is provided to the viewer's screen based on information from sensors placed on camera tripods recording the event. Such sensors feed information about the camera head's exact position, and such information is relayed to a central computer system creating the football graphics. Camera head position is then used in determining the proper placement of lines or indicators that are provided to the viewer's display together with the view provided by the camera. The present design may employ a series of static markers, such as around the perimeter of the field of play, that can be viewed by cameras recording the event. The system can use the static markers as references for creating the various elements that appear in the display.

Sports Surface Observer Participation System

The foregoing description illustrates the sports surface 101 and components thereof. The sports surface 101 may be successfully employed with an electronic system that allows for audience or observer participation from a person at the site or at a remote location such as watching on television or on a computer or wireless device over a wireless network or the internet.

Figure 3:
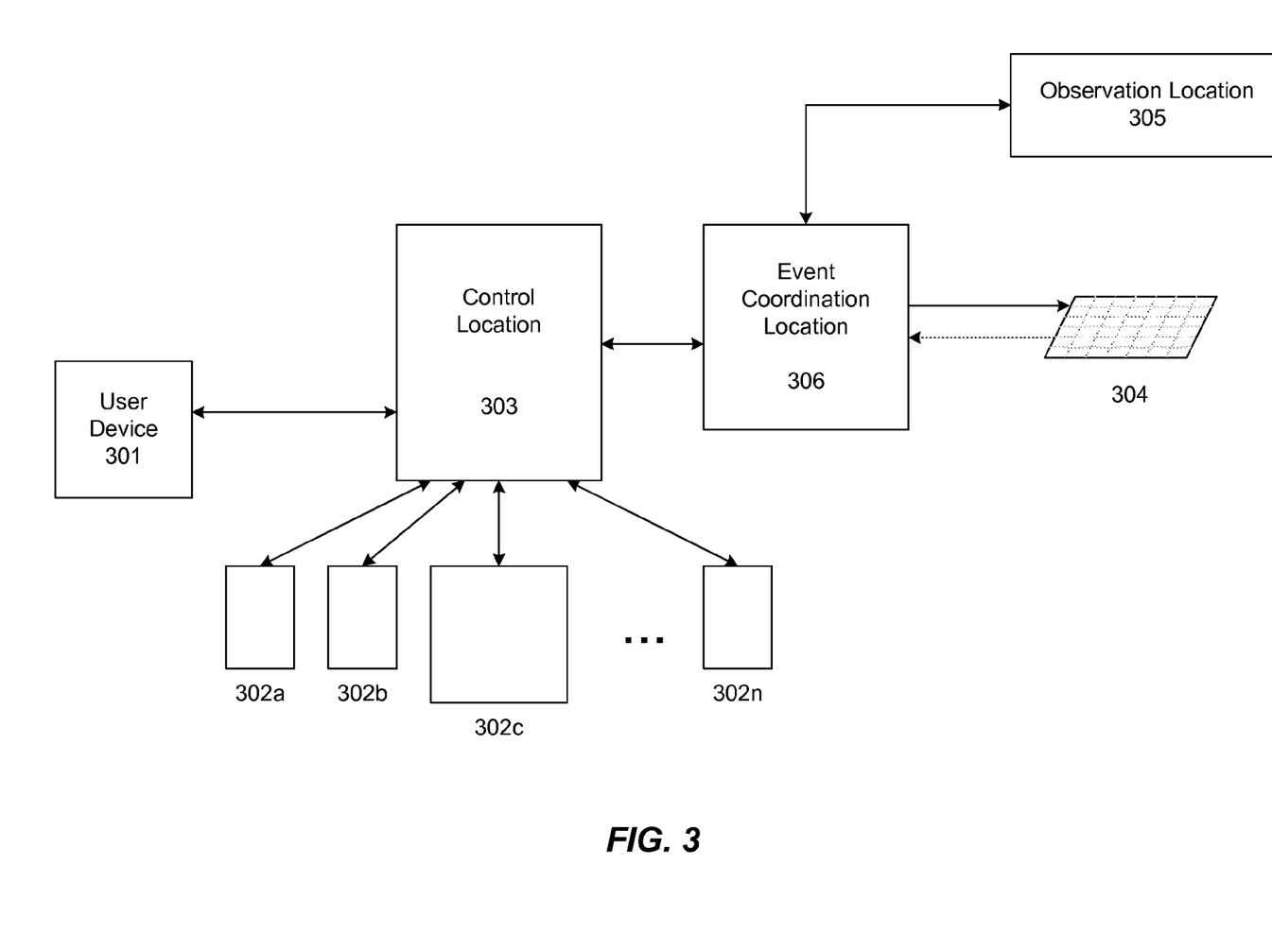
FIG. 3 illustrates a system used to control the interactive sports surface and the display of information thereon, such as when receiving information from and/or interacting with at least one user device.

FIG. 3 illustrates the overall design of the participation system. A user may interact with a user device 301, including but not limited to a computing device, cell phone, smartphone, tablet computing device, game console, or other interactive device able to transmit information (email, text, internet transmissions such as electronic responses to poll questions, and so forth). Additional user devices 302*a-n* are also shown, having the ability to communicate with a control location 303.

Control location 303 may be a centralized server arrangement or group of servers or other functional computing arrangement, is configured to receive information from the user devices 301 and 302*a-n*, and information may be provided via the internet, wirelessly, or in any manner otherwise known. Control location 303 may be located near the event or may be a remote computing center away from the field of play that receives and tabulates information and sends information collected to event coordination location 306. Control location 303 typically receives information from the user devices 301 and 302*a-n* and may provide information to those devices. Sports surface 304 represents the sports surface discussed herein, with the capability of displaying sport surface items such as foul lines, boundary lines, bonus and penalty areas, and so forth.

An observation location 305 is illustrated wherein a person or persons may observe the competition ongoing on the sports surface 304 or may have user devices monitoring other information related to the competition, or may simply develop ideas related to the competition. Observation location 305 may include cameras recording the event, capturing the action with video transmitted in raw form or with graphics provided to the other components in the system. While a single observation location is shown in FIG. 3, it is to be understood that the present design is not so limiting, and multiple observation locations and/or personnel may be provided with communication connections as shown with observation location 305.

Event coordination location 306 may receive information from observation location 305, including any cameras recording the event, sports surface 304 if provided with sensors, and control location 303. While shown as distinct in FIG. 3, it is to be understood that the observation location 305, event coordination location 306, and control location may all be collocated, such as in a single room, and persons in the room may have user devices. Functionality described may be combined into a single component or distributed over various components. For example, a first graphics generator may be provided to display court parameters and a second graphics generator to display bonus or penalty areas.

With respect to sensors, it is further understood that sensors may be placed elsewhere, such as on or in the equipment of participants, such as their shoes, to obtain information related to the competition for display or query/polling purposes. Sensing may include sensing player movement on the field of play. Sensors may be located below the covering surface 201, atop or in the covering surface 201, or at any advantageous location. Cameras, microphones, and other equipment may be provided under the covering surface 201 as desired.

In operation, the sports surface will have sporting competitors playing thereon. Persons observing the competition, such as from a sideline or observation booth or via a viewing device (television, etc.), shown as observation location 305, may observe certain events occurring, such as players on team A not successfully making free throws in a basketball competition. They may provide options to viewers, such as "Should the free throw line be moved in two feet for Team A?" or "Should the free throw line be moved out two feet for Team B?" or "Should player X be awarded three points if he makes his next free throw?" or "Should we place a moratorium on fouls committed by Team B on Team A's side of the court?" or, in essence, virtually any question or poll related to the sports competition occurring on sports surface 304.

In one embodiment, event coordination location 306 may include a TV remote mobile unit divided into various sections to accommodate the tasks that take place televising an event, such as a trailer having event producers and/or executive producers present, and a separate graphics area or device arrangement dedicated to receiving information from control location 303, cameras and announcers represented by observation location 305. Information from these locations or devices may be processed with appropriate graphics generated, and the feed sent to sports surface 304.

Alternately, such questioning or polling may originate at control location 303 based on little or no information received from observation location 305, including polling on changes desired in play. Once poll or query information is available at either control location 303, observation location 305, or event coordination location 306, a question or poll may be formatted and transmitted to individual user devices such as user device 301 or 302*a*-302*n*. User preferences for receiving such questions or polls may be provided by the user on his/her computing device, and questions or polls may be transmitted to only those who have expressed a desire to receive the question or poll or to certain desired groups or individuals. For example, if a person has indicated he has an interest in basketball generally, but is not watching a game where Player A is participating, he may nevertheless be provided with a poll or question regarding Player A or other aspects of the game. Control location may place a question or poll out to users in any acceptable and available way, such as by placing the poll or question on a web site, in a text message, email, television broadcast, cablecast, or in any other available way.

Users may then enter a desired outcome, answer, or result on their user devices 301 or 302*a-n*, such as "I do not want to see the service box moved for tennis player G" or "I want to provide a 5 point bonus if players on team B make a half court shot" or any other response to a poll or query. Certain polls or queries may apply to one player, multiple players, one team, or both teams, and may include bonuses, penalties, or any desired change in play. At a certain point, information may be compiled such as at control location 303 or event coordination location 306 and the results may be made available by any reasonable communication means to those who answered the question or participated in the poll or may be made generally available on a web site or broadcast on a television broadcast or cablecast of the sporting event.

Once a poll or query has been resolved, the result of the query or poll may be effectuated, including by altering the images provided on the sports surface 304. Lines may be changed "hot spots" or forbidden zones established, time lines established, colors changed, and so forth. The participants will typically be informed before the event as to the possible changes to play that could be expected, such that for example a "hot spot" displayed on the sports surface 304 is understood by the participants and the officials, scorekeepers, and other appropriate personnel. Different display elements may have different meaning, such as red for penalty, green for bonus, gold for a "hot spot," and so forth, generally understandable to the participants and viewers. The different displays may be changed as desired to effectuate the desires of the audience and/or those controlling the display on the sports surface.

While the previous discussion describes polling or querying an audience, either present at the sporting event or located remotely and possibly viewing the event on television, it should be understood that polls, questions, or queries are not required. Those controlling the information or images displayed on sports surface 304 may provide changes in the display, such as in the case of timing changes (during the final one minute of each quarter, the three point lines for each basketball team move in three feet; during long tennis rallies, certain bonus regions will be displayed enabling the player to receive a monetary bonus, etc.) Thus changes in display on sports surface 304 are not exclusively driven by audience participation, but can be decided by persons controlling the display provided on sports surface 304 or based on time or other considerations.

In the polling or query situation, control location 303 may transmit information to the user devices 301 and 302*a-n*, and may receive information, selections, choices etc. from the various user devices. Control location 303 may provide poll and query information, receive responses, and may also facilitate group collaboration, such as a group of friends wishing to submit their own alterations to the display on sports surface 304. For example, persons watching the event or interested in the event may be provided access to a chat session where they can collaborate and decide that they would like to submit a poll, query, or direction for changing the image display on sports surface 304. Hence control location 303 generally represents a device or devices that control(s) the user experience, i.e. the information provided to the user, information received from the user, and the means for engaging and/or interacting with the user.

Control location 303 may be mining or collecting and analyzing data regarding users providing information via user devices 301 and 302*a-n*. Such data may be used in various ways as applicable, including used to provide advertising believed to be of interest to a user or users, and to engage the users during or after the sporting event.

Figure 4:
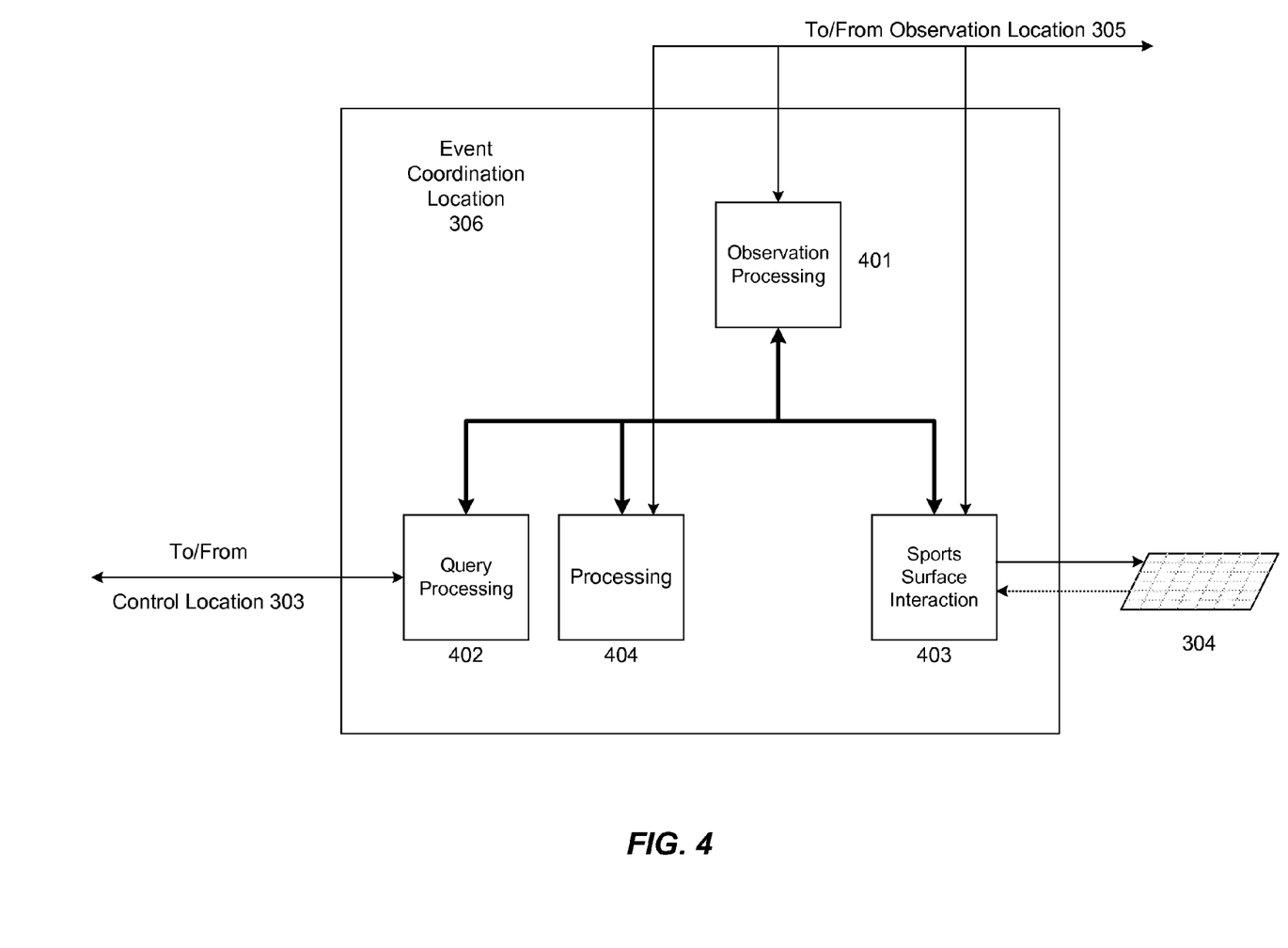
FIG. 4 shows one embodiment of components of the event coordination location or device.

FIG. 4 illustrates certain general components provided in event coordination location 306. Observation information may be received, such as from observation location 305 and may be processed by observation processing module 401. Observation module 401 may take the form of an executive producer trailer or truck where personnel such as the event producer and/or executive producer may watch and listen to the output of a mobile unit and offer input or direction to an event floor manager, for example, located at or near sports surface 304. Additionally, observation processing module 401 may receive announcer audio and/or video, create queries, create or provide query responses, and send instructions to the various locations throughout the system.

Observation processing module 401 may generate information from observers regarding status of the competition, suggestions by observers for queries or polls, or other relevant information. Such information may be processed, including with user interaction, to provide queries or status updates or other information to users or viewers or scoreboards or other displays near the field of play. The observation processing module 401 thus generates competition information as well as suggestions for polls, questions, and queries, transmitted to module 402 where such information is typically put in text form or in a format for ready distribution to users, processes the information received and transmits potential poll questions, questions, or observation information.

Query processing module 402 receives the queries and questions and prepares such queries and questions for transmission to users. Query processing module 402 may provide or maintain a list of names, email or DNS addresses or other information related to those who are to receive the information. Data mining may be performed at this point. Additionally, query processing module 402 may transmit collected information to displays at the arena or venue or on television to scoreboards as appropriate, including text information ("Player Q has not made a three point basket this season") or other information for general transmission. Query processing module 402 may transmit query or question information to control location 303 and may transmit other information to control location 303 or other devices in the arrangement.

In one situation, query processing module 402 may act as a receiving center for control location 303 and may transmit the information received as appropriate and in an appropriate format to processing module 404, which may take the form of a television mobile unit, for inclusion in a telecast. Query processing module and the other modules illustrated may make adjustments to the sports surface display based on input received from user devices 301 and 302*a-n*.

Sports surface interaction module 403 may receive information from sports surface 304, such as sensor information if available and received from observation location 305, and may transmit such information to other components for subsequent processing, generally to determine whether a goal has been achieved (a player taking an indoor soccer shot from a specific region, a player's foot touching an out of bounds line, a ball touching out of bounds, and so forth). Sports surface interaction module 403 also determines display information on sports surface 304, including positioning or repositioning lines, areas, colors, and so forth. If a boundary is to move, sports surface interaction module receives information conveying the change to be made and provides commands or information to the display or displays making up sports surface 304 moving the boundary line. Any other display change is conveyed via sports surface interaction module 403, such as placement of advertising, color changes, and so forth.

Sports surface interaction module may generate sports surface graphics, bonus/penalty areas, "hot spots" and/or other zones, tracking graphics, and may transmit to sports surface 304 and a television truck or mobile unit or processing module 404.

Processing module 404 receives information from the other modules and determines actions to be taken based on information provided. In one arrangement, processing module 404 may take the form of or be included in a television mobile unit and query processing module 402 receives this information from control location 303 together with data from observation processing module 401. Cameras, audio equipment, announcers, and graphics may be provided with or associated with processing module 404, and queries, responses, and competition score may be provided using processing module 404. Such information may be collected and processed and transmitted to sports surface interaction module 403 for display on sports surface 304.

Alternately, information from query processing module 402 may indicate persons/users have approved a query and persons in control location 303 or functionality in control location dictates that the finish line in a footrace is to be moved. Processing module 404 then transmits signals to sports surface interaction module 403 which causes movement of the finish line on a display or multiple displays of sports surface 304.

Sports surface module 403 may detect that a player's foot was in a penalty zone at a certain time, and based on this detection, information processing module 404 may convey such information to observation processing module 401 with an indication that a penalty is to be assessed, or may otherwise convey relevant information to other devices in the system. As an example, a player stepping in a penalty area may be desired to result in the field of play and all displays turning red, and sports surface interaction module 403 may provide such color change commands to sports surface 304. Alternately, out of bounds decisions and other ruling determinations may be made by officials present or based on processed video received from cameras located at or in communication with observation location 305.

Alternately, observation processing module 401 may generate information that the players in a badminton match have excessively been using the left side of the court, such information may be processed by processing module in a manner such as "any excessive play in one area triggers a poll to see if people wish to place a penalty zone in the area or a bonus when playing outside the area," and may convey such a query or poll to query processing module 402. If the results received by query processing module are a consensus that bonus/penalty zones not be deployed, this information may be conveyed to observation processing module 401 and possibly observation location 305 and announcers may convey the results or the results displayed, such as on a television broadcast or cablecast.

Polling or queries may be resolved in any manner, such as the most votes winning, votes above 50 percent or some other percentage being implemented, most popular decision winning, least popular decision causing a change in display to the sports surface 304, and so forth. Results may be compiled over a designated period of time and results determined and implemented in any manner desired, including according to rules established and available to observation processing module 401 or other components in the system.

The processing module 404 thus receives and directs information to the other modules in event coordination location 306. Any other functionality required to effectuate changes to the sports surface and polling or questioning or implementing desired display changes may occur in processing module 404 and/or sports surface interaction module 403, and rules may be applied as appropriate. As with the other devices and components illustrated in FIG. 3, memory storage and a processor or processors may be provided in event coordination location 306 to effectuate the functionality described herein. Further, the functionality described with respect to event coordination location 306, as with other devices illustrated, may be performed on other devices or may be combined into or divided among devices.

Information or broadcast images may be provided from the components illustrated. For example, event coordination location 306 may transmit via satellite uplink, fiber optics, cable, and so forth for distribution by a network, cable operator, cable channel, internet service provider, or other appropriate entity.

Thus a sports surface arrangement is provided. The sports surface arrangement includes at least one display, each display mounted in a substantially horizontal orientation facing in an upward direction, a substantially transparent covering layer positioned above the at least one display, and a controller configured to alter at least one image displayed on the at least one display to alter attributes of a sporting event occurring on the substantially transparent covering layer. Alternately, an apparatus is provided that includes a controller configured to transmit sports related display information to at least one horizontally mounted display screen and a substantially transparent surface positioned above the horizontally mounted display screen and configured to withstand sports competitors participating in a sporting event thereon. The controller conveys display information related to the sporting event occurring on the substantially transparent surface to the display.

Further, a system for use in association with a sporting event is provided. The system includes an interactive sports surface configured to have the sporting event occurring thereon and display information related to the sporting event occurring thereon and a controller configured to convey display information to the interactive sports surface. Alternately, a system is provided including an interactive sports surface configured to have the sporting event occurring thereon and concurrently display information related to the sporting event occurring thereon, and means for controlling information displayed via the interactive sports surface. The means for controlling is configured to convey display information related to the sporting event to the interactive sports surface.

Those of skill in the art will recognize that any step of a method described in connection with an embodiment may be interchanged with another step without departing from the scope of the invention. Those of skill in the art would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed using a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A sports surface arrangement configured for athletes to play upon in a competition, the sports surface arrangement comprising:
    a plurality of adjacent electronic display surfaces, each electronic display surface mounted in a substantially horizontal orientation facing in an upward direction;
    a plurality of substantially transparent covering layers positioned above the plurality of adjacent electronic display surfaces, where each electronic display surface has a corresponding individual transparent covering layer disposed above, wherein the plurality of substantial transparent covering layers are configured to allow an athlete to play the competition thereupon; and
    a controller configured to alter at least one image displayed on at least one electronic display surface of the plurality of electronic display surfaces to alter attributes of the competition occurring on the plurality of substantially transparent covering layers; wherein the sporting event comprises a sporting event employing a hard surface for the athletes to play upon.

2. The sports surface arrangement of claim 1, wherein each substantially transparent covering layer comprises one from a group consisting of glass, polycarbonate, Plexiglas, Acrylite®, Optix®, Perspex® and Polycast®.

3. The sports surface arrangement of claim 1, further comprising at least one pressure sensor positioned between the plurality of electronic display surfaces and the plurality of substantially transparent covering layers.

4. The sports surface arrangement of claim 1, wherein a gap is formed between the plurality of display surfaces and the plurality of substantially transparent covering layers.

5. The sports surface arrangement of claim 1, wherein the plurality of substantially transparent covering layers are located adjacent the plurality of display surfaces.

6. The sports surface arrangement of claim 1, wherein each of the substantially transparent covering layers comprise multiple sheets of substantially transparent materials.

7. The sports surface arrangement of claim 1, wherein the sporting event comprises a game of tennis, volleyball, basketball, racquetball, badminton, team handball, fencing, bowling and/or soccer between the athletes playing upon the plurality of substantially transparent layers.

8. A sports surface arrangement configured for athletes to play upon in a sporting event, the sports surface arrangement comprising:
    a plurality of substantially horizontally mounted electronic display surfaces;
    a plurality of substantially transparent layers positioned above the plurality of substantially horizontally mounted electronic display surfaces, where each electronic display surface has a corresponding individual transparent layer disposed above; and
    a controller configured to alter an image provided on at least one of the plurality of substantially horizontally mounted electronic display surfaces based on factors related to the sporting event occurring on the plurality of substantially transparent layers; wherein the competition comprises a sporting event employing a hard surface for the athletes to play upon.

9. The sports surface arrangement of claim 8, wherein each substantially transparent layer comprises one from a group consisting of glass, polycarbonate, Plexiglas, Acrylite®, Optix®, Perspex® and Polycast®.

10. The sports surface arrangement of claim 8, further comprising at least one pressure sensor positioned between the plurality of horizontally mounted display surfaces and the plurality of substantially transparent layers.

11. The sports surface arrangement of claim 8, wherein a gap is formed between the plurality of horizontally mounted display surfaces and the plurality of substantially transparent layers.

12. The sports surface arrangement of claim 8, wherein the plurality of substantially transparent layers are located adjacent the plurality of horizontally mounted electronic display surfaces.

13. The sports surface arrangement of claim 8, wherein each of the substantially transparent layers comprises multiple sheets of substantially transparent materials.

14. The sports surface arrangement of claim 1, wherein the competition comprises a game of tennis, volleyball, basketball, racquetball, badminton, team handball, fencing, bowling and/or soccer between the athletes playing upon the plurality of substantially transparent covering layers.

15. An apparatus for use in association with a sporting event for sport competitors to play upon, the apparatus comprising:
    a controller configured to transmit sports related display information to at least one of a plurality of horizontally mounted electronic display screens; and a plurality of substantially transparent surfaces positioned above the plurality of horizontally mounted electronic display screens and configured to withstand sports competitors participating in a sporting event thereon;

wherein the controller conveys display information related to the sporting event occurring on the plurality of substantially transparent surfaces to the plurality of display screens; wherein the sporting event comprises a sporting event employing a hard surface for the competitors to play upon.

16. The apparatus of claim 15, wherein each substantially transparent surface comprises one from a group consisting of glass, polycarbonate, Plexiglas, Acrylite®, Optix®, Perspex® and Polycast®.

17. The apparatus of claim 15, further comprising at least one pressure sensor positioned between the plurality of horizontally mounted electronic display screens and the plurality of substantially transparent surfaces.

18. The apparatus of claim 15, wherein a gap is formed between the plurality of horizontally mounted display screens and the plurality of substantially transparent surfaces.

19. The apparatus of claim 15, wherein the plurality of substantially transparent surfaces are located adjacent the plurality of horizontally mounted display screens.

20. The apparatus of claim 15, wherein each of the substantially transparent surface comprises multiple sheets of substantially transparent materials.

21. The sports surface arrangement of claim 15, wherein the sporting event comprises a game of tennis, volleyball, basketball, racquetball, badminton, team handball, fencing, bowling and/or soccer between the competitors playing upon the plurality of substantially transparent layers.

* * * * *